July 8, 1969 — L. F. SCHMID — 3,453,905
DIFFERENTIAL BRAKE FOR DIFFERENTIAL GEARS OF MOTOR VEHICLES
Filed May 5, 1966

INVENTOR
LEOPOLD F. SCHMID

BY Craig & Antonelli

ATTORNEYS

United States Patent Office 3,453,905
Patented July 8, 1969

3,453,905
DIFFERENTIAL BRAKE FOR DIFFERENTIAL GEARS OF MOTOR VEHICLES
Leopold F. Schmid, 49 Pichekstrasse,
7000 Stuttgart, Germany
Filed May 3, 1966, Ser. No. 547,223
Claims priority, application Germany, May 3, 1965,
Sch 36,979, Sch 36,980, Sch 36,981, Sch 36,982;
Nov. 2, 1965, Sch 39,247; Feb. 18, 1966, Sch 38,515
Int. Cl. F16h 1/44
U.S. Cl. 74—710.5                                   8 Claims

ABSTRACT OF THE DISCLOSURE

An automotive differential gear arrangement with a driven rotatable differential housing, wheel driving opposed bevel gears within the housing, differential bevel gears in driving engagement with the opposed bevel gears, and a clutch between the housing and one of the shafts of the opposed bevel gears for partially or completely blocking the differential gear arrangement, wherein the clutch is a cone clutch disposed between the bearings supporting the housing, has a frictional surface mean diameter that is larger than the internal diameter of the housing and is provided with a spring for constant biased engagement. Also, wedging means may be provided to increase the clutch frictional engagement upon relative rotation between clutch surfaces.

Background of the invention

In differential gears the wheel driving shafts and the differential housing do not rotate relatively to each other as long as the two driven road wheels rotate at the same speed. When the motor vehicle travels through a curved path the speeds of the two driven wheels differ and the difference is taken care of by the differential gear; in this case the wheel driving shafts and the differential housing rotate at different speeds, the differential housing moving relatively to the wheel driving shafts. Differential gears without a clutch have the disadvantage that no torque can be applied to the other wheel when the one wheel slips on ice, snow or mud, and the vehicle can therefore come to a standstill, or be unable to move when already at rest. A known clutch for a differential gear is disposed between a part rotating at the speed of a wheel driving shaft and a part rotating at the speed of the differential housing and impedes or prevents relative moment between the wheel driving shaft and the differential housing. It produces a clutching moment between these two parts. Since the torque transmitted by the differential gear is always twice the torque occurring at the wheel with the lower driving force, a minimum moment is established by this clutching moment and is transferred in any case to the one driving wheel even when the adhesion of the other driving wheel on the supporting ground is negligibly small, for example owing to an icy road surface or the like.

Known differential clutches are constructed so that two disc clutches are provided inside the differential housing which clutches are nonrotatably connected to the wheel driving shafts and are pressed by springs against the inner surface of the differential housing, thus opposing relative movement between the wheel driving shaft and the differential housing by means of a clutching moment.

Furthermore, the torque transmitted by the differential gear may be utilized for increasing the friction force of such a differential clutch, for example by the use of axially displaceable pressure plates which are urged apart by the bearing pin of the planet wheels by means of inclined surfaces. In another known differential clutch the clutching pressure produced by springs is increased by the splaying effect which is exerted on the differential bevel wheels by the planet wheels.

If it is disposed in a known manner within the differential housing the differential clutch and the clutching surfaces can only be very small. Small clutching surfaces require a high pressure and thus large means for dissipating the heat produced. However, the production of a large quantity of heat within the differential housing is very undesirable, and devices which produce the necessary high pressures can be accommodated only with difficulty within the differential housing. Such differential gears or blocking differentials are therefore unsuitable for the high demands made by land vehicles.

Attempts have been made to avoid this disadvantage by disposing differential clutches outside the differential housing. Known clutches of this kind however are located in a special housing which contains substantially only the clutch. This in turn has the disadvantage that a part rotating at the speed of the wheel driving shaft and a part rotating at the speed of the differential gear must be introduced into this housing. The constructional expense is necessarily high.

Also differential blocking devices are known which, in contrast to the differential clutches which at times are called blocking differentials, do not permit adjustment of a friction moment between the differential housing and a wheel driving shaft, but which in the operative state are capable of coupling the two parts rigidly to each other. In a known differential blocking device of this kind the neck of the differential housing is extended beyond its bearing into a separate chamber of the axle casing which also houses a cone which is rigidly connected to the wheel driving shaft and a coupling sleeve by means of which the cone connected to the wheel driving shaft and the conically tapered end of the neck of the differential housing can be rigidly coupled to each other. All differential blocking devices however have the disadvantage that they permit only two operative states, that is to say, an engaged state in which they couple the differential housing rigidly to the wheel driving shaft, and a disengaged state in which the coupling or blockage is removed, and no clutch is present which is capable of reducing or impeding relative movement between the differential housing and the wheel driving shaft. Such differential blocking devices are not the subject of the present invention.

The invention is based on the object of providing an efficient clutch device for a differential gear at a small constructional expense. The invention consists in a clutching device for a differential gear, having at least one clutching surface non-rotatably attached to the differential housing and a counter surface non-rotatably connected to a wheel driving shaft wherein the clutching surface is disposed outside the differential housing in the region between two bearings in the axle casing which support the differential housing and between which the differential housing is disposed.

A particular advantage of the invention lies in the fact that by disposing the clutching surface outside the differential housing the differential gear can be constructed in the normally preferred manner without additional devices and in a simple manner. Since the clutching surface is disposed outside the differential housing the disspation even of large quantities of heat which may be produced provides no difficulties. Since the clutching surface is disposed in the region between the bearing supporting the differential housing in the axle housing special chambers need not be provided in the axle housing for receiving the differential clutch. This advantage is particularly important because private motor cars have as a rule only very little space available in the vicinity of the differential gear for an additional chamber in the axle housing adapted to receive a differential clutch. The differential clutching device according to the invention has therefore a compact and space-saving construction and can be produced at an economic price.

In one embodiment of the invention the diameter of the clutching surface is larger than the internal diameter of the differential housing in which the planet wheels are supported. Thereby a sufficiently large clutching surface is obtained so that even in the case of large clutching moments the clutching surface is not loaded excessively and the differential clutch can therefore remain engaged even during extensive drives over difficult ground, without quantities of heat being produced which are so large that their dissipation would create difficulties.

If it is important to provide a clutching surface having as large a radius as possible, the clutching surface of one embodiment of the invention can be provided, for example at the circumference of a crown wheel which is attached to the differential housing and by means of which the driving moment is introduced into the differential housing. In other embodiments of the invention the clutching surface can be provided alternatively on a flange of the differential housing or on a special disc which is which is attached for example to the differential housing at non-rotatably connected to the differential housing and the side of a driving pinion opposite the crown wheel engaged by the latter. The invention however is not limited to a clutching surface disposed on an annular radially outwardly extending part of the differential housing. It may alternatively be provided on a conically shaped part of the outer surface of the approximately spherical region of the differential housing.

In embodiments of the invention the clutch member which is nonrotatably connected to the wheel driving shaft may be adapted for limited rotation relatively to a constructional component which connects this clutch member to the wheel driving shaft, and inclined surfaces may be provided which increase the pressing force of the clutch during such a limited rotation of the clutch member relatively to the constructional component. Thereby the torque introduced into the differential gear is used for increasing the pressure of the differential clutching device.

The differential housing driven by a motor by means of the pinion is normally mounted in the axle casing. If the clutch member is to engage a clutching surface constituted by a section of the outer surface of the differential housing which has a large diameter, an intermediate member transmitting the rotation must lead from the clutch member to the hub of the differential housing through which the wheel driving shaft extends and must be nonrotatably connected there to the wheel driving shaft. Normally however the differential housing is mounted in the axle casing in the region of such a hub. If the invention is shown in such a differential gear the intermediate member which connects the displaceable clutch member non-rotatably to the wheel driving shaft may be supported in one embodiment of the invention by means of a bearing in the axle casing. This embodiment of the invention can be modified further in that for the purpose of receiving the axal displacement force produced when the clutch is actuated, the clutch section which is nonrotatably connected to a driving shaft, as well as the differential housing are supported in the axle casing by means of bearings absorbing the axially acting pressure. Thus this embodiment of the invention has the advantage that the force necessary for pressing the displaceable clutch member against the clutching surface is absorbed directly by the axle housing.

In the last-mentioned embodiment of the invention the bearing between the intermediate member and the differential housing may be constructed for example as a slide bearing. Tests have shown that this simple construction is perfectly satisfactory, since this bearing is not highly stressed. If such guidance of the intermediate member past the bearing of the differential housing is to be avoided, other embodiments of the invention provide that the differential housing is mounted in the axle casing at an outer diameter which is larger than the outer diameter of the clutching surface.

In further embodiments of the invention the clutch member connected to a wheel driving shaft may be constructed as an axial spring. This embodiment of the invention has the advantage that special springs which urge the clutch member against the clutching surface can be omitted. This embodiment of the invention can be modified further inasmuch as the axial spring is provided with a plurality of resilient tongues which project from a rigid ring. These resilient tongues may be limited by an enlargement in the form of a polygon so that the cuts separating the individual tongues cannot penetrate further into the ring.

The clutch member constructed as an axial spring has the advantage that weight, production costs, space requirements and assembly time can be saved.

Further features of the invention are clear from the following description of embodiments of the invention in conjunction with the claims and the accompanying drawings. The individual features may be used in embodiments of the invention either by themselves or several of them may be used in combination.

*Brief description of the drawing*

Some embodiments of the invention will now be described by way of example with reference to the accompanying drawings, in which.

Figure 1:
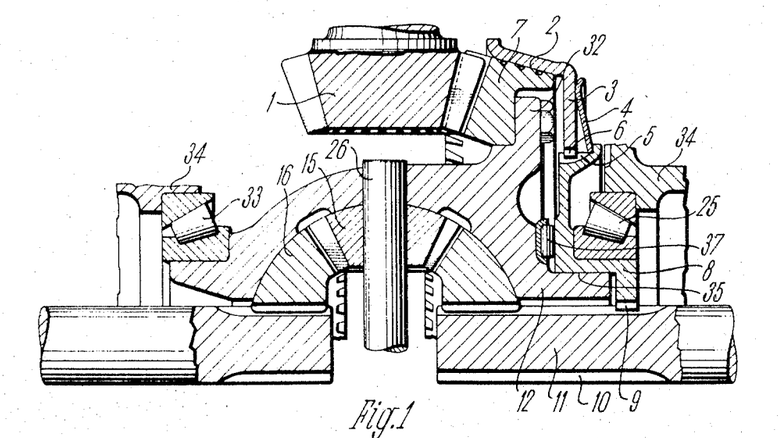
FIG. 1 is a partial section through a differential gear of one embodiment of the invention.

In the embodiment of the invention illustrated in FIG. 1 planet wheels 15 are rotatably mounted on a shaft 26 in the interior of a differential housing 12. The planet wheels 15 engage differential bevel wheels 16 which are nonrotatably connected to wheel driving shafts 11 for the wheels of a motor vehicle. A driving pinion 1 which is rotatably mounted in an axle housing 34 and which is driven by a transmission shaft engages the teeth of a bevel gear wheel 7 which is attached to a flange 32 of the differential housing 12. The differential housing 12 is rotatably mounted in the fixed axle casing 34 by means of inclined roller bearings 25 and 33.

The outer teeth 10 of a wheel driving shaft 11 are engaged by the inner teeth 9 of an intermediate member 8 which is supported on the axle casing by means of a roller bearing 25 and in which in turn a neck or a hub of the differential housing 12 is mounted by means of a slide bearing 35.

The intermediate member 8 has outer teeth 5 which are engaged by inner teeth 6 of an axially displaceable clutch member 3 which is urged axially against a conical face 2 at the outer periphery of the bevel gear wheel 7 by means of a dished spring 4, the conical face 2 serving as clutching surface. The differential housing 12 is driven by the pinion 1 by means of the bevel gear wheel 7. The intermediate member 8 is axially nondisplaceable; its outer teeth 5 are made so long that the clutch member 3 can be axially displaced thereon for compensation of wear of the clutching surface 2. The dished spring 4 urges the clutch member 3 always with the same force against the clutching surface 2 so that a relative movement between the wheel driving shaft 11 and the differential housing 12 is always opposed by the same clutching moment. A roller bearing 37 which absorbs the forces acting in an axial direction is provided between an end face of the intermediate member 8 and an adjacent end face of the differential housing 12.

Figure 2:
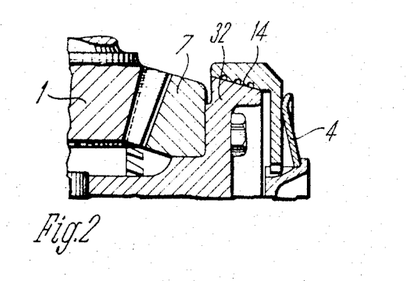
FIG. 2 is a partial section corresponding to FIG. 1 of a second embodiment of the invention.

The embodiment according to FIG. 2 differs from the embodiment according to FIG. 1 merely in that a clutching surface 14 is not provided at the outer periphery of the bevel gear wheel 7, but at the outer periphery of the flange 32.

Figure 3:
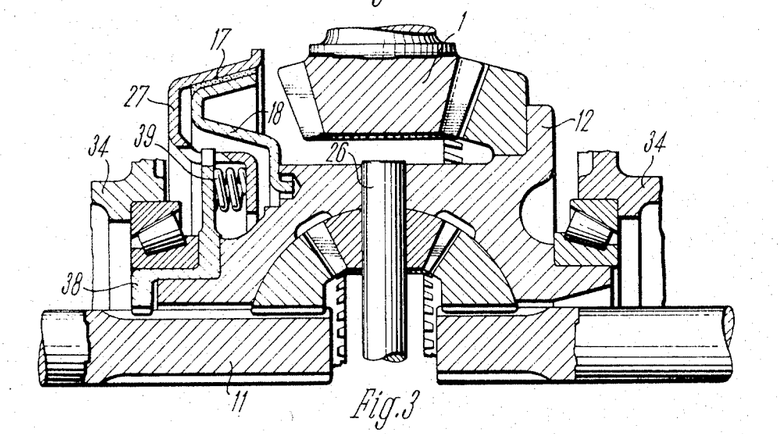
FIG. 3 is a section corresponding to FIG. 1 of another embodiment of the invention.

In the embodiment according to FIG. 3 a special annular member or disc 18 is attached to the differential housing 12 at the side of the pinion 1 opposite the bevel gear wheel 7 and has a conically extending outer surface 17 which serves as the clutching surface. A clutch member 27 is also constructed as a profiled annular member; it is nonrotatably connected to a wheel driving shaft 11 by means of an intermediate member 38. The intermediate member 38 corresponds substantially to the intermediate member 8 in the embodiment according to FIG. 1; its outer teeth engage in corresponding gaps between teeth of the annular member 27 which serves as a clutch member. In place of the dished spring 4 used in the embodiment according to FIG. 1 a plurality of helical springs 39 are inserted in the embodiment according to FIG. 3 between a flange of the profiled annular member 27 and the intermediate member 38 and urge the clutch member against the clutching surface 17.

Figures 4, 5, 6, 7, 8:
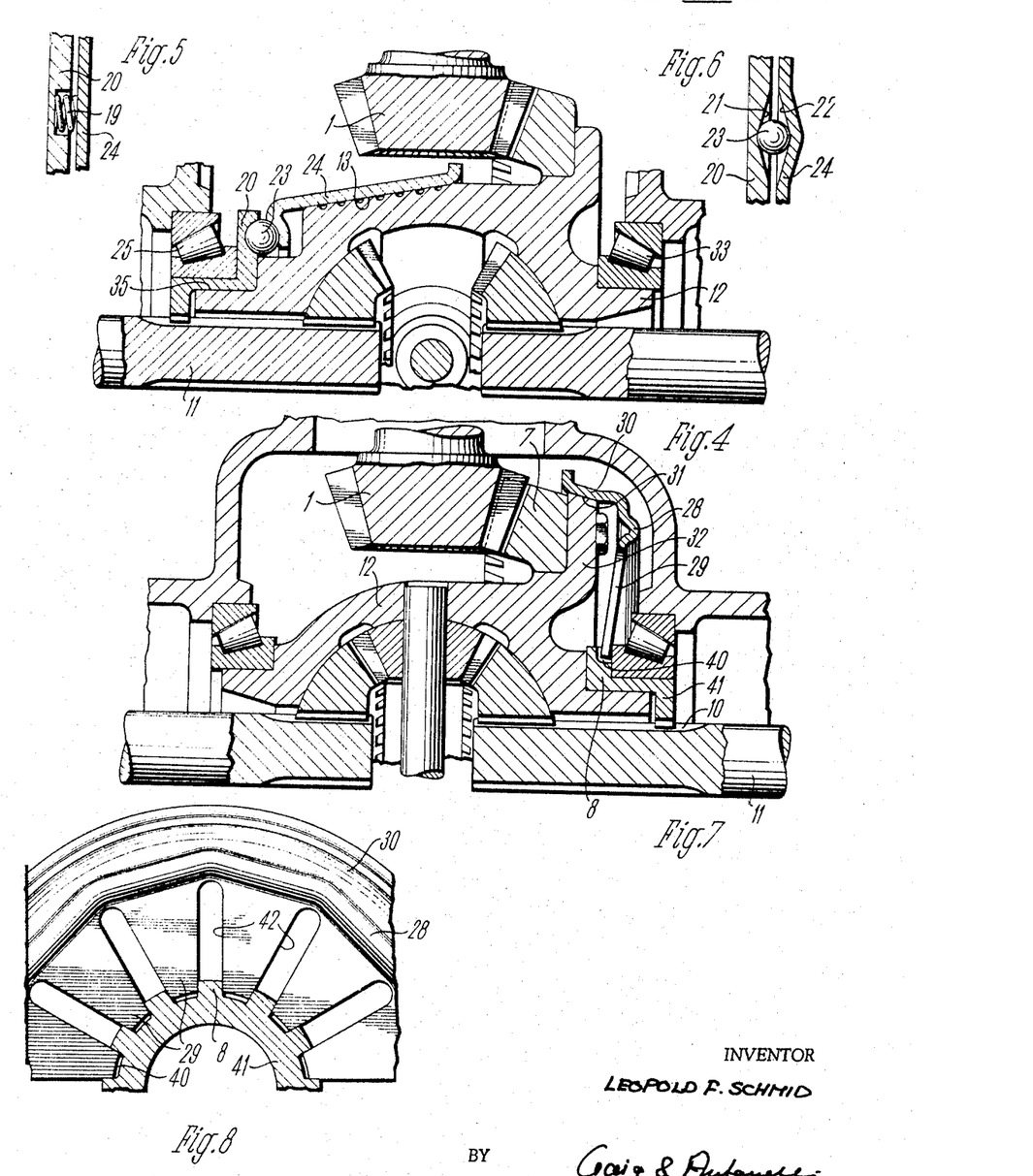
FIG. 4 is also a partial section through the differential gear of a further embodiment of the invention.
FIGS. 5 and 6 illustrate details of the embodiment according to FIG. 4.
FIG. 7 is a section corresponding to any of FIGS. 1 to 3 of the differential gear of a further embodiment of the invention.
FIG. 8 is a plan view of the member 30 of FIG. 7.

In the embodiment according to FIG. 4 a clutching surface 13 is provided directly on the outer periphery of an approximately spherical portion of the differential housing 12, and, therefore, in contrast to the embodiments according to FIGS. 1 to 3, not on a radially outwardly extending constructional component. A clutch member 24 which engages this surface 13 is non-rotatably connected to a wheel driving shaft 11 by means of an intermediate member 20, in such manner that the clutch member 24 can rotate to a limited extent relatively to the intermediate member 20. Compression springs 19 are provided between the intermediate member 20 and the clutch member 24 and urge the clutch member 24 against the clutching surface 13 with a definite clutching force. Balls 23 are disposed between the clutch member 24 and the intermediate member 20 and lie in depressions of the clutch member 24 as well as of the intermediate member 20 the edges of which are constructed as obliquely extending ramps 21 and 22 (FIG. 6). If in consequence of the spinning of a driving wheel a relative rotation of the wheel driving shaft 11 relatively to the differential housing 12 occurs, the clutch member 24 which is also driven by the differential housing 12 performs a limited rotation relatively to the intermediate member 20 which is nonrotatably connected to the wheel driving shaft 11. Thereby the balls 23 leave their depressions and their peripheries rest against the ramps or the inclined surfaces 21 and 22 so that the clutch member 24 is pressed against the clutching surface 13 with the pressure produced thereby, additionally to the pressure of the helical springs 19. The relative movement between the clutch member 24 and the intermediate member 20 is limited by the measure by which the clutch member 24 can be axially displaced under the effect of this limited relative movement.

The embodiments of the invention illustrated in FIGS. 7 to 10 differ from the embodiments of the invention described heretofore in that the clutch member itself is constructed as an axial spring. In the embodiment according to FIG. 7 in which a clutching surface 31 is disposed on the outer surface of the flange 32 of the differential housing 12 a clutch member 30 consists of a profiled ring which has individual tongues 29 which project inwardly and which engage in a nonrotatable manner outer teeth 40 of an intermediate member 41, the inner teeth of which engage the outer teeth 10 of the wheel driving shaft 11. The resilient tongues 29 of the profiled ring constituting the clutch member 30 are produced in a simple manner by punching slots 42 into the ring. At the base of the tongues 29 the clutch member 30 constructed as a profiled ring has an enlargement 28 which extends in the form of a polygon and which prevents the stresses caused by the resilient tongues 29 from extending to and deforming the friction surface of the clutch member. Also this enlargement ensures a straight bending edge which is necessary for a good function of the tongues 29 constructed as triangular springs.

Figure 9:
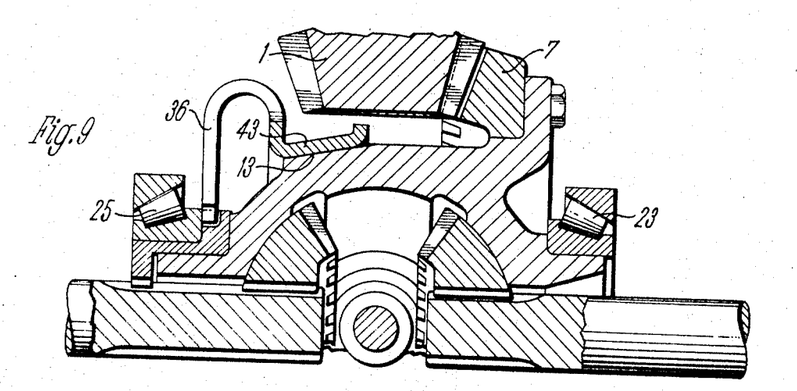
FIG. 9 is a section corresponding to FIG. 4 of a further embodiment of the invention.
Figure 10:
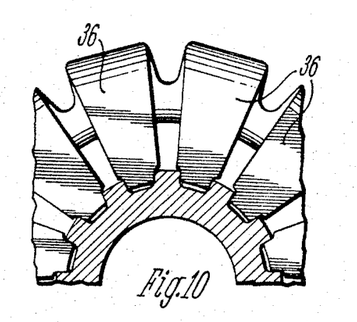
FIG. 10 is a plan view corresponding to FIG. 8 of the member 43 of FIG. 9.

The embodiment according to FIG. 9 differs from the embodiment of the invention illustrated in FIG. 7 by a slightly different construction of a clutch member 43 which is constructed as an axial spring and which is also constituted by a profiled ring and has tongues 36 which are resilient in the axial direction and which also engage outer teeth 40 of an intermediate member 41. In this embodiment of the invention the clutching surface 13 is not formed by a radially outwardly projecting member of the differential housing 12, but in a similar manner as in the embodiment according to FIG. 4 by the outer surface of the approximately spherical housing portion. The clutch member 43 is located at the side of the pinion 1 remote from the bevel gear wheel 7. The resilient springs 36 are approximately U-shaped in this embodiment of the invention.

In the following FIGS. 11 to 18 still further embodiments of the invention are illustrated as examples of constructional details of the clutching device and of the disposition of the clutching surfaces.

Figures 11, 12:
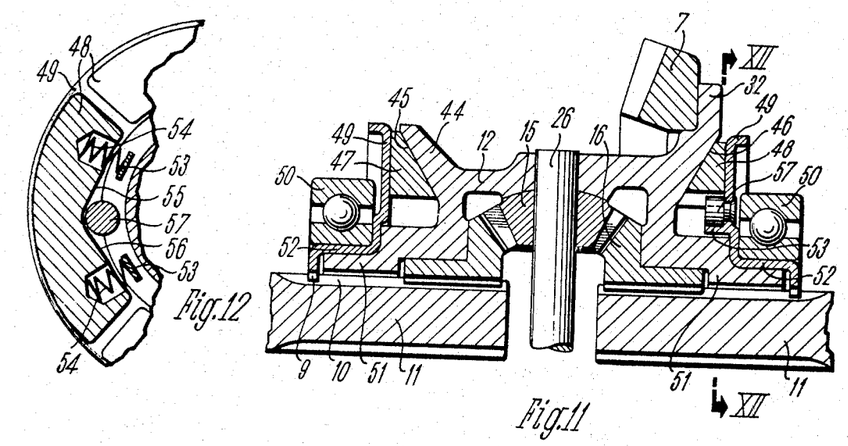
FIG. 11 illustrates a further embodiment of the invention in the view of FIG. 1.
FIG. 12 is a section along the line XII—XII of FIG. 11.

FIG. 11 illustrates an embodiment of the invention which has two clutches so that the radius of the clutching surface and also the pressure with which the clutch member engages the clutching surfaces can be smaller than in the case in which only one clutch is provided. In the embodiment of the invention illustrated in FIG. 11 the differential housing 12 has not only a flange 32 for the attachment of the bevel gear wheel 7 but also a further obliquely outwardly extending flange 44. Clutching surfaces 45 and 46 constructed as internal cones are provided at the flanges 32 and 44 and are engaged by clutch members 47 and 48 which have corresponding internal conical surfaces. The clutch members 47 form segments of a multipart clutch ring so that the clutch members 47 engage the whole length of the clutching surfaces 45 and 46. The clutch members 47 are supported in an axial direction on intermediate members 49 which in turn are supported on roller or needle bearings 50 which provide a bearing for the differential housing 12 in the axle casing 34. One neck 51 of the differential housing 12 is supported radially in a sleeve-like section 52 of the disc-like intermediate member 49; the outer periphery of the section 52 rests on the roller bearing 50. Each of the intermediate members 49 has on its inner surface lugs 53 on which springs 54 are supported which urge the clutch members 47 outwardly and press them thereby against the clutching surfaces 45 and 46.

The clutch members 47 and 48 have on their inside successive inclined surfaces 55, 56 of different directions of inclination so that an approximately V-shaped recess is produced. Pins 57 are attached to the intermediate members 49 and engage the bottoms of these V-shaped recesses so that on relative movement an amplification of the force of the springs 54 occurs in the same manner as described already with reference to FIG. 4.

Figures 13, 14, 15:
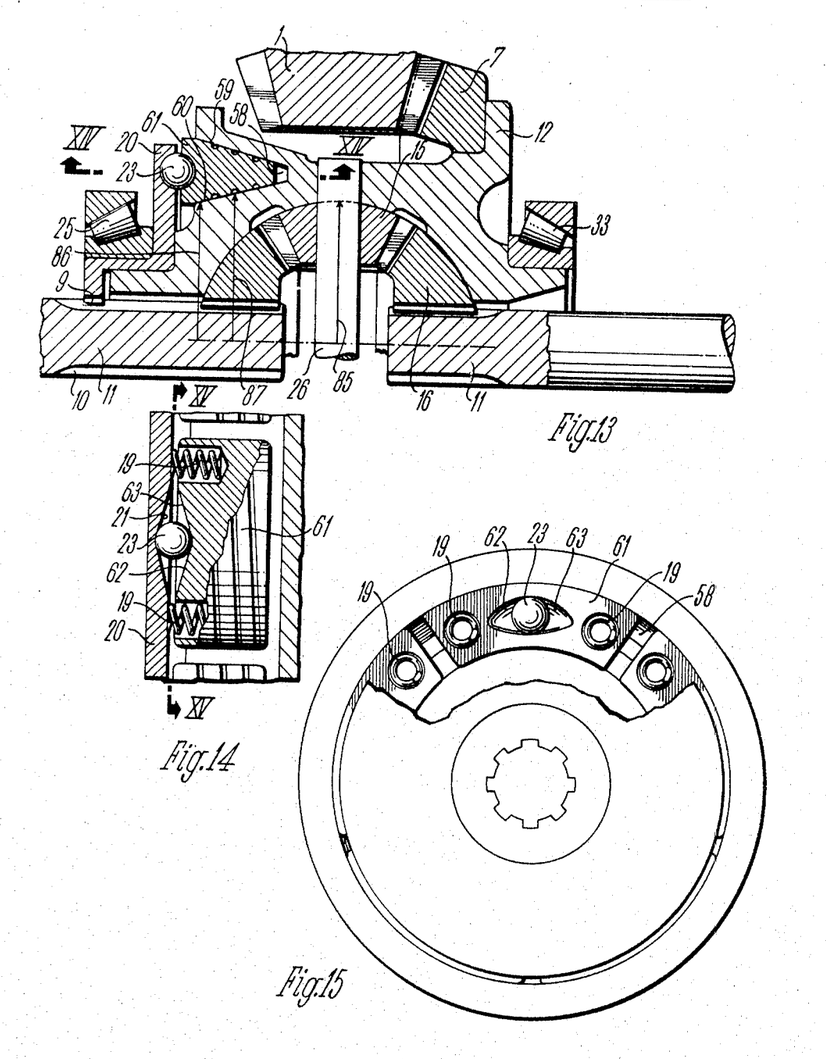
FIG. 13 illustrates another embodiment of the invention in the view of FIG. 1.
FIG. 14 is a section on the line XIV—XIV of FIG. 13.
FIG. 15 is a section on the line XV—XV of FIG. 14.

FIGS. 13 to 15 illustrate an embodiment of the invention which differs from the embodiment according to FIGS. 4 to 7 merely in that the clutching surface is in the form of a V-shaped groove 58 the two flanks of which form clutching surfaces 59 and 60. Clutch members 61 engage this groove 58 of the differential housing 12 which are constituted by ring sections and which are supported in an axial direction by means of springs 19 and balls 23 on the intermediate member 20. The balls 23 are disposed, as in the example according to FIGS. 4 to 6, on the one hand between inclined or wedge surfaces 21 at the intermediate member 20 and on the other hand on corresponding inclined or wedge surfaces or ramps 62 and 63 in clutch members 61 forming the ring sections. In this case also the clutch members are pressed against the clutching surfaces not only by the force of the springs 19, but on relative movement between the clutch members 61 and the intermediate members 20, and also by the balls 23 running on to the inclined surfaces. In this embodiment according to FIGS. 13 to 15 as well as also in the embodiments according to FIGS. 4 to 6 and 11 to 12, each clutch member 24, 47, 48 or 61 rotates relatively to the intermediate member 20 or 49 relatively to which it is rotatable to a limited extent, when the clutch body is pressed against the clutching surface by the springs 19 with such force that on relative rotation between the differential housing 12 and the wheel driving shaft 11 the member follows first the movement of the clutching surface which is rigidly connected to the differential housing and therefore performs a relative movement relatively to the intermediate member 20 or 49, whereby the member is pressed initially more strongly against the clutching surface under the effect of the inclined surfaces by means of which it is supported on the intermediate member. The angle of inclination of the inclined surfaces must be so great that self impedance is excluded.

The disposition of the double conical clutch formed in this embodiment by the V-shaped groove 58 on the side of the pinion 1 opposite the clutch bevel gear wheel is particularly space saving. The space required is not greater than the space available in the conventional constructions of motor vehicle axles. In this embodiment of the invention the internal diameter 85 of the differential housing 12 on which the planet wheels 15 are supported is approximately as large as the smallest diameter 86 of the clutching surface 60. In the embodiments according to FIGS. 1 to 10 and 16 to 18 the smallest diameter of the clutching surfaces is larger than the internal diameter 85 of the differential housing 12. The mean clutching surface diameter 87 is larger in all embodiments than the diameter 85.

Figure 16:
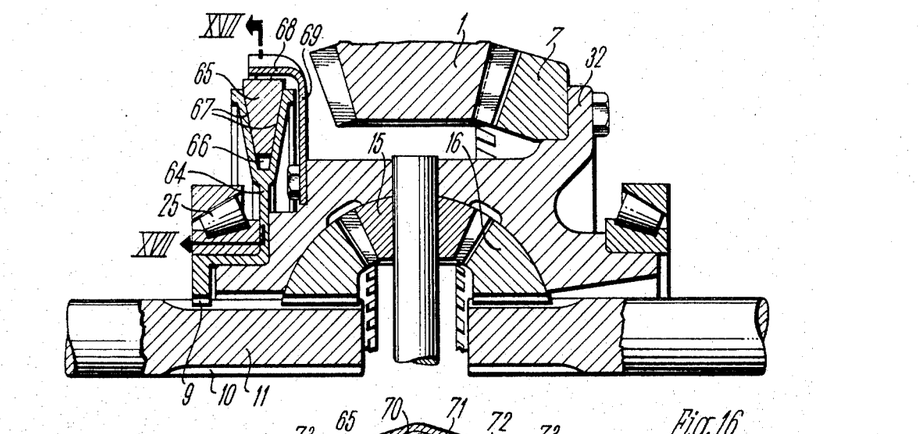
FIG. 16 illustrates another embodiment of the invention in the view of FIG. 1.
Figure 17:
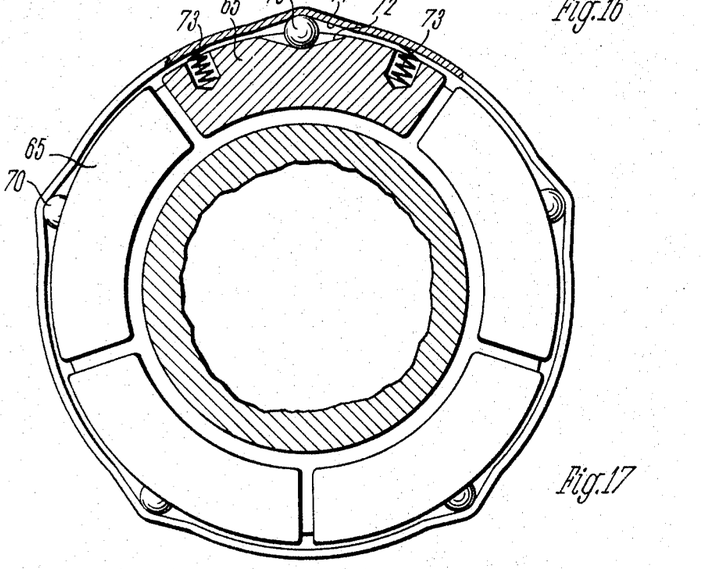
FIG. 17 is a section on the line XVII—XVII of FIG. 16.

The embodiment of the invention illustrated in FIGS. 16 and 17 differs from the embodiment according to FIGS. 13 to 15 substantially in that the groove 66 which has a V-shaped cross-section and the flanks 67 of which form the clutching surfaces, is disposed on the periphery of the intermediate member 64. Segments of a clutch ring constituting the clutch members 65 engage this groove 66 in a radial direction and are rotatable to a limited extent in a disc member 69 which has a flange 68 and which is non-rotatably connected to the differential housing 12. The clutch members 65 are supported by means of rollers 70 on the inner surface of the flange 68 in the manner described with reference to the embodiments according to FIGS. 4 to 6 and 11 to 15, in this case also inclined or wedge surfaces 71 and 72 being provided on this inner surface as well as on the adjacent outer surfaces of the clutch members 65, and the clutch members 65 being additionally pressed into the clutch groove 66 by springs 73. Since the clutch members 65 are pressed outwardly by centrifugal force at a high rotary speed of the differential housing 12 a control of the clutching force is obtained which is approximately dependent upon the rotational speed. At a slow drive over difficult ground the pressing force obtained by the springs 73 is greater than the centrifugal force so that the clutch members 65 are always in operative engagement and produce a clutching moment. At a fast drive on a good road the clutching moment decreases since the centrifugal force opposing the springs 73 increases in proportion to the square of the rotary speed. This is desirable in particular in the case of private motor cars and sports vehicles for example when travelling around bends at a high speed. This is effected without deterioration of the driving safety when the clutching moment is correspondingly low. In this embodiment also the intermediate member 64 which is nonrotatably connected to the wheel driving shaft serves for mounting the differential housing in the axle casing. The wedge-like clutch member 61 in the embodiment according to FIGS. 13 to 15 and the clutch member 65 in the embodiment according to FIGS. 16 and 17 may have obliquely extending grooves in the surfaces which cooperate with the clutching surfaces in order to increase the friction grip of the clutch.

Figure 18:
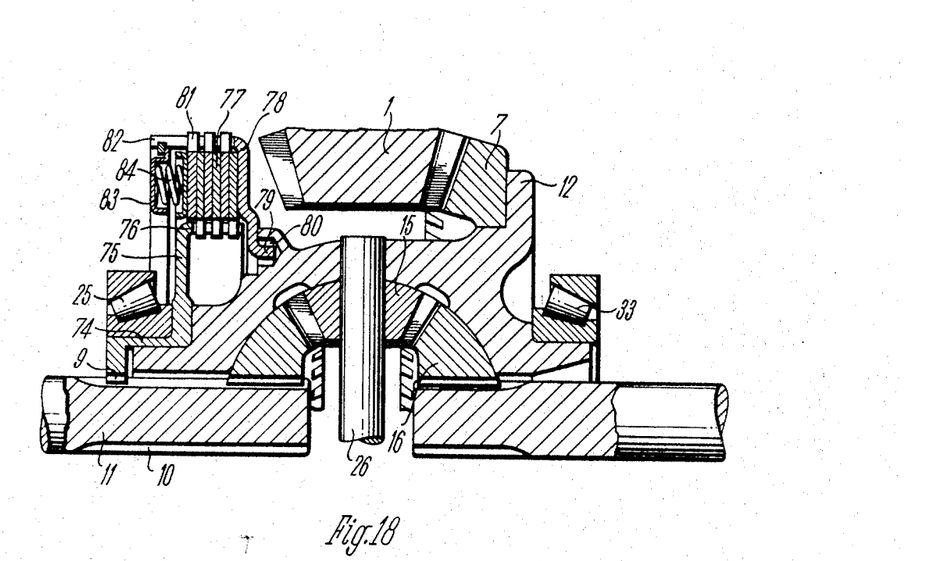
FIG. 18 illustrates an embodiment of the invention with a disc brake.

In a last embodiment of the invention illustrated in FIG. 18 a disc clutch is provided in place of a conical clutch. A disc-like intermediate member 75 provided with a sleeve portion 74 is nonrotatably connected by means of a toothed connection 9, 10 to the wheel driving shaft 11. This intermediate member 75 carries at its outer flange 76 clutch discs 77 which are nonrotatably but axially displaceably attached to the flange 76. A disc 78 which forms simultaneously a housing for the disc clutch is nonrotatably connected to the differential housing 12 by means of a plug connection 79, 80. The disc 78 carries clutch discs 81 which are nonrotatably but axially displaceably attached thereto. A supporting member 83 is rigidly connected to the end of the flange portion 82 of the disc 78 and supports a plurality of springs 84 which press the clutch discs 81 and 77 against each other and produce thereby a constant clutching moment between the differential housing 12 and the wheel driving shaft 11. The disc clutch is disposed on the side of the pinion opposite the bevel gear wheel 7. The effective clutching radius of this disc clutch can be made so large by this arrangement that even in the case of land vehicles which must operate continuously on difficult ground a good life is obtained in spite of the high sensitivity of the discs to overheating. The use of a plug connection for coupling the disc clutch to the differential housing 12 enables not only the initial assembly of such differential clutches to be performed conveniently, but also vehicles which are normally delivered without a differential clutch can be easily provided afterwards with such a clutch. The inwardly projecting edge of the flange 76 of the intermediate member 74 which carries the clutch discs 77 constitutes a stop for an axially outwardly directed movement of the disc 78 forming the clutch housing. The disc 78 and the stack of clutch discs connected thereto is secured axially in that the outermost disc 77 moves into engagement with the bottom of the groove. The intermediate member 75 is axially fixed by the inclined roller bearing 25.

What I claim is:

1. A blocking automotive differential gear arrangement with a driven differential housing rotatably supported in the axle casing by way of bearings, bevel gear wheels drivingly mounted on the opposed ends of two wheel drive shafts and in driving engagement with planetary gear wheels, and clutch means for blocking the differential gear arrangement, wherein the improvement comprises: said clutch means being a cone clutch having one clutch friction surface fixedly connected with the differential housing and the other friction surface drivingly connected to one of the wheel drive shafts; said clutch means being disposed between the bearings supporting the differential housing in the axle casing; said clutch means friction surface mean diameter being larger than the internal diameter of the differential gear housing; and said clutch means having spring means biasing said friction surfaces into constant engagement 2. A device according to claim 1, wherein said differential housing includes an outwardly extending flange carrying said one clutch friction surface.

3. A device according to claim 1, wherein said one clutch friction surface is on the outer surface of the differential housing.

4. A device according to claim 1, including a bevel gear fixedly carried on said differential housing and having said one clutch friction surface.

5. A device according to claim 1, wherein said spring means is an axially effective spring in the power path between said other clutch friction surface and said one of the wheel drive shafts.

6. A device according to claim 5, wherein said axially effective spring is a disk-like member having said other clutch friction surface and being resiliently distorted in the axial direction of said rotatable differential housing.

7. A device according to claim 6, wherein said disk-like member includes a plurality of inwardly extending resilient tongues.

8. A device according to claim 7, wherein said disk-like member includes a reinforcing enlargement in the form of a polygon disposed at the bases of said resilient tongues.

References Cited

UNITED STATES PATENTS

| | | | |
|---|---|---|---|
| 584,301 | 6/1897 | Baxter | 192—54 XR |
| 2,159,983 | 5/1939 | Colby | 74—710.5 |
| 2,855,806 | 10/1958 | Fallon | 74—710.5 |
| 2,894,416 | 7/1959 | Scott | 74—710.5 |
| 3,002,401 | 10/1961 | Weir | 74—710.5 |
| 3,053,114 | 9/1962 | Singer | 74—710.5 |
| Re. 25,500 | 12/1963 | O'Brien | 74—710.5 |
| 3,191,708 | 6/1965 | Simonds et al. | 74—710.5 XR |
| 3,306,130 | 2/1967 | Salzmann | 74—710.5 |
| 2,229,319 | 1/1941 | Wesselhoff. | |
| 3,211,022 | 10/1965 | Anderson | 74—711 |
| 3,327,564 | 6/1967 | Tharpe | 74—711 |

FOREIGN PATENTS 463,551  7/1928  Germany.

LEONARD H. GERIN, *Primary Examiner.*

U.S. Cl. X.R.

192—54, 89